Oct. 6, 1942.  R. A. GOEPFRICH  2,298,007
HYDRAULIC ACTUATOR
Filed May 15, 1940
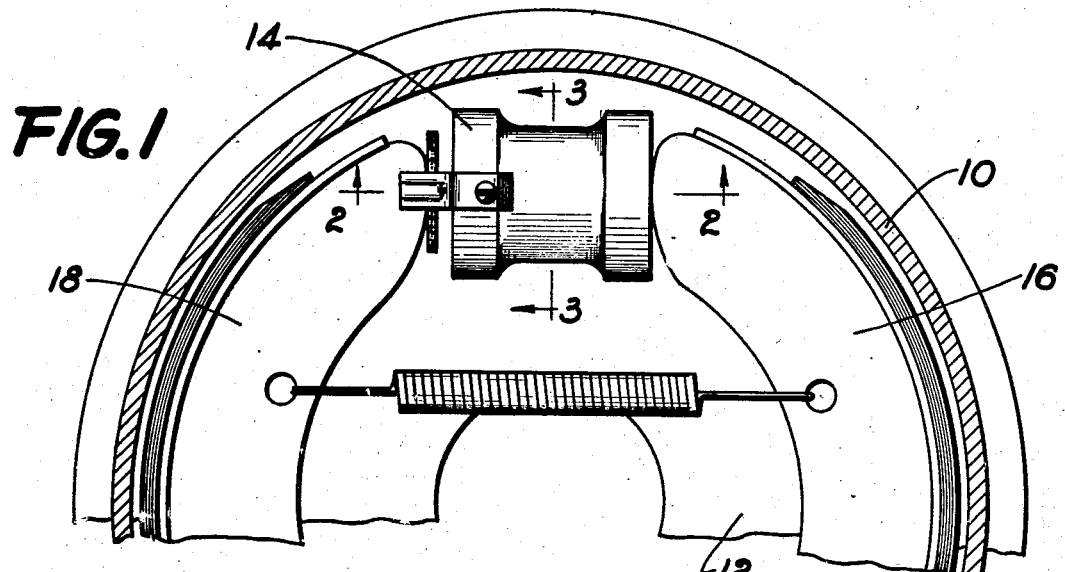
FIG.1
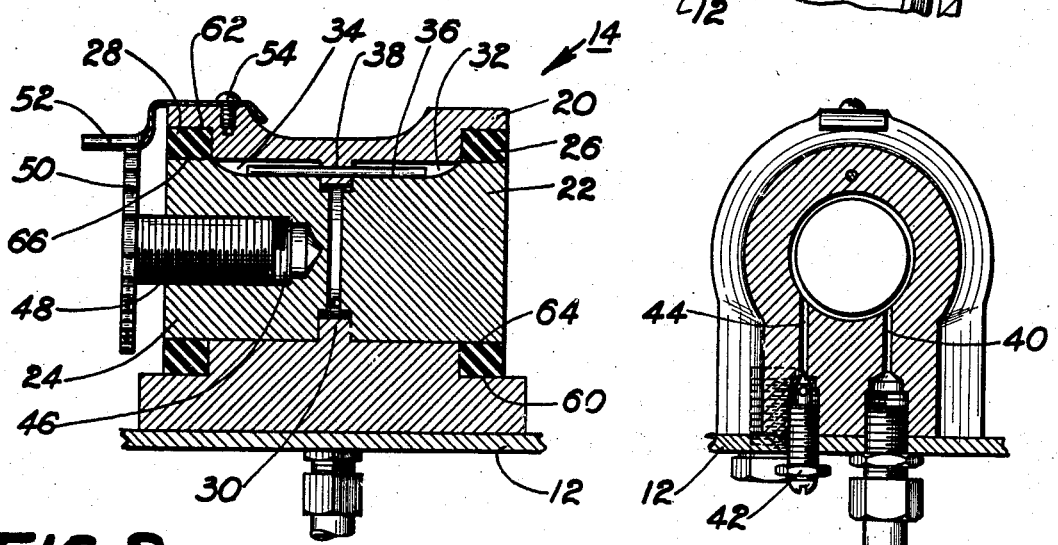
FIG.2
FIG.3
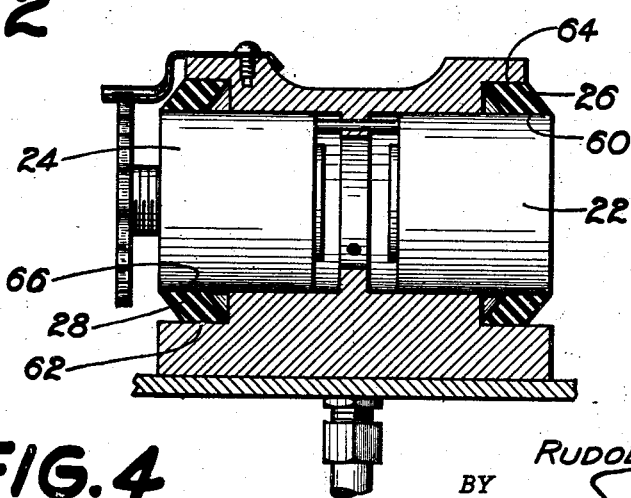
FIG.4
INVENTOR
RUDOLPH A. GOEPFRICH
BY
ATTORNEY Patented Oct. 6, 1942

2,298,007

UNITED STATES PATENT OFFICE 2,298,007

HYDRAULIC ACTUATOR

Rudolph A. Goepfrich, South Bend, Ind., assignor to Bendix Aviation Corporation, South Bend, Ind., a corporation of Delaware Application May 15, 1940, Serial No. 335,235

10 Claims. (Cl. 60—54.6)

This invention relates to fluid sealing means, and will be illustrated as embodied in a seal for a hydraulic cylinder in a hydraulic braking system.

It is one of the objects of my invention to provide a sealing means of such nature that all danger of pinching the seal between the piston and cylinder wall will be eliminated, the use of an inexpensive machining process being thereby made practicable.

A further object is to provide a seal which will be positive in its sealing action, i. e., which does not depend on the pressure of the fluid for its sealing effectiveness.

A further and very important object of my invention is to eliminate the wear of the cup type of seal caused by sliding of the cup along the cylinder wall during brake applying and releasing movements, with the consequent scuffing and wear of the cup surfaces and accompanying danger of leakage in the hydraulic system.

My invention makes possible the provision of a very inexpensive and yet effective hydraulic wheel cylinder assembly. Further objects and desirable particular features of my invention will be apparent during the course of the following description. Reference will be had during the description to the accompanying drawing, in which:

Figure 1 is a section showing the upper portion of a wheel brake assembly, the section being taken in a plane just inside the head of the brake drum, showing the brake shoes in side elevation;

Figure 2 shows a horizontal section through the center of the hydraulic wheel cylinder which is shown in Figure 1 and which incorporates my improved sealing means;

Figure 3 is an enlarged section taken on the line 3—3 of Figure 1, and

Figure 4 is a horizontal section through the center of the wheel cylinder, and is in all respects similar to Figure 2 except that it shows the parts of the wheel cylinder in brake applying or brake applied position.

The brake of Figure 1 comprises a rotatable brake drum 10, and a non-rotatable brake applying assembly including a stationary backing plate 12, a novel hydraulic wheel cylinder 14 secured to the backing plate, and brake shoes 16 and 18 mounted on the backing plate and arranged to be moved by actuation of the hydraulic cylinder into contact with the brake drum.

The hydraulic wheel cylinder 14 comprises a cylinder wall 20, a pair of pistons 22 and 24 reciprocable therein, and a pair of sealing elements 26 and 28 for preventing escape of pressure fluid from the cylinder. An annular inwardly extending flange 30 on the cylinder wall serves as an abutment against which the pistons rest in their innermost or brake release position. Grooves 32 and 34 are provided in the pistons 22 and 24 respectively, and a key 36 extending through an opening 38 in the flange 30 and into the grooves 32 and 34 holds the pistons from rotation about their axes. A fluid inlet 40 is provided for admitting pressure fluid to the chamber formed by the inner wall of the cylinder and the inner ends of the pistons. A bleeder screw 42 is screwed into a bleed opening 44 of the well known type to furnish means for bleeding the hydraulic system. As indicated by the dotted lines of Figure 3 the cylinder 14 is bolted to the backing plate.

The piston 24 has an internally threaded groove 46, into which is screwed an adjusting element 48. The outer end of the adjusting element 48 consists in a ratchet wheel 50 which is locked in place after adjustment by a thin metal strip 52 bolted to the cylinder at 54. The web of the shoe 16 contacts the outer surface of the piston 22, and the web of the shoe 18 contacts the outer surface of the ratchet wheel 50. It is therefore apparent that, when the brakes are applied, pressure fluid will be forced from the hydraulic system through the inlet 40 into wheel cylinder 14 to spread the pistons 22 and 24 and to thus exert an applying force on the brake shoes 16 and 18.

The sealing elements 26 and 28 are annular resilient members and are bonded, for example by vulcanizing, along their respective surfaces 60 and 62 to the wall of the wheel cylinder 14. They are also vulcanized or bonded along the surfaces 64 and 66 to the pistons 22 and 24 respectively. It will be noted that grooves or notches have been provided in the cylinder wall to accommodate the sealing elements 26 and 28, and that the said sealing elements are vulcanized to the cylinder wall along a line parallel to the axes of the pistons, but that they are not vulcanized to the cylinder wall along the line formed by the portion of the said wall which is perpendicular to the axes of the pistons.

The resiliency of the sealing elements 26 and 28 allows the pistons 22 and 24 to move from brake release to brake applying positions while the vulcanized surfaces of the sealing elements maintain a fluid tight seal between the pistons and the cylinder. It is obvious that there is no sliding of the sealing elements along the cylinder wall, inasmuch as one surface of the sealing elements is vulcanized to the said cylinder wall. It is also obvious that the sealing action is positive and does not depend upon fluid pressure to accomplish the necessary sealing. Further, because of the fact that the sealing members are not in danger of being pinched between the cylinder and the pistons, it is not necessary that the pistons and cylinder be as carefully machined as has been heretofore desirable.

Figure 4 shows the position of the parts of the wheel cylinder after brakes have been applied. It will be noted that the pistons 22 and 24 have been spread apart and that the sealing elements 26 and 28, which formerly were rectangular in cross section, have now taken the form of parallelograms in cross section. Resiliency of the sealing elements has allowed their surfaces to remain fastened to the cylinder wall and to the surfaces of the pistons during the movement of the pistons necessitated by actuation of the hydraulic system to apply the brakes. When the brakes are released, the pistons and sealing elements return under the influence of retractile elements to their original positions.

While I have described a particular embodiment of my invention disclosed herein, it is not intended that the said invention be limited to that specific embodiment or that it be limited otherwise than by the terms of the appended claims.

I claim:

1. A hydraulic actuator comprising an open ended cylinder wall having an inwardly extending flange at a distance from the end of the cylinder and having a circumferential groove around the inside of the cylinder wall open at the open end of the cylinder, a piston reciprocable between the flange and the end of the cylinder wall adapted to anchor at times against the flange, and a resilient sealing element bonded to the inwardly facing bottom surface of the cylinder wall groove and bonded to the outer cylindrical surface of the piston, the said sealing element being under shear during movement of the piston away from the flange.

2. A hydraulic actuator comprising a cylinder wall, a piston reciprocable therein, means for keying the piston to the cylinder wall to prevent rotation of the piston about its axis, and an annular resilient sealing means bonded to the inner cylindrical surface of the cylinder wall and to the outer cylindrical surface of the piston, said sealing means being under shear during outward movement of the piston.

3. A hydraulic actuator comprising a cylinder wall, a piston reciprocable therein, means for keying the piston to the cylinder wall to prevent rotation of the piston about its axis, an adjusting member screwed into the outer end of the piston and rotatable relative to the piston to change the distance between the outer end of the adjusting member and the inner end of the piston, and an annular resilient sealing means bonded to the inner cylindrical surface of the cylinder wall grove and bonded to the outer cylindrical surface of the piston, the said sealing cylinder wall and to the outer cylindrical surface of the piston, said sealing means being under shear during outward movement of the piston.

4. A hydraulic actuator comprising an open ended cylinder wall having an inwardly opening groove open at one end of the cylinder, a piston reciprocable in the cylinder and guided in its reciprocating movements by the cylinder wall, and a resilient sealing element inserted in the groove in the cylinder wall and bonded to the cylinder wall and to the piston, said sealing element being under shear during outward movement of the piston.

5. A hydraulic actuator comprising a cylinder wall having an annular groove adjacent one end thereof, a piston reciprocable within the cylinder and slidingly engaging the inner surface of the cylinder wall so that its reciprocating movements are guided by the said cylinder wall, and a resilient sealing element inserted in the groove in the cylinder wall and bonded to the cylinder wall and to the piston, said groove being arranged to allow movement of the sealing element axially of the cylinder except for the restraining influence of the bond and said sealing element being under shear during outward movement of the piston.

6. A hydraulic actuator comprising a cylinder wall, a piston reciprocable within the cylinder and slidingly engaging the inner surface of the cylinder wall so that its reciprocating movements are guided by the said cylinder wall, and a resilient sealing element bonded to the inner cylindrical surface of the cylinder wall and to the outer cylindrical surface of the piston, said sealing element being positioned in a groove in one of the cooperating parts large enough to permit free movement of the sealing element axially of the cylinder except for the restraining influence of the bond and said sealing element being under shear during outward movement of the piston.

7. A hydraulic cylinder comprising a cylinder wall, a piston reciprocable therein and guided in its reciprocating movements by the interior surface of the cylinder wall, means associated with the cylinder wall for limiting the inward movement of the piston, means associated with the aforesaid means for preventing rotation of the piston about its axis, and a resilient sealing element having a surface bonded to the piston and having a surface bonded to the cylinder wall, said sealing element being positioned in an annular groove in the cylinder wall.

8. A hydraulic cylinder comprising a cylinder wall, a piston reciprocable therein and guided in its reciprocating movements by the interior surface of the cylinder wall, means associated with the cylinder wall for limiting the inward movement of the piston, means associated with the aforesaid means for preventing rotation of the piston about its axis, and a resilient sealing element having a surface bonded to the piston and having a surface bonded to the cylinder wall.

9. A hydraulic cylinder comprising a cylinder wall, a piston reciprocable therein and guided in its reciprocating movements by the interior surface of the cylinder wall, means associated with the cylinder wall for limiting the inward movement of the piston, and a resilient sealing element having a surface bonded to the piston and having a surface bonded to the cylinder wall, said sealing element being positioned in a groove in one of the cooperating parts large enough to permit free movement of the sealing element along the axis of the cylinder except for the restraining influence of the bond.

10. A hydraulic cylinder comprising a cylinder wall, a piston reciprocable therein and guided in its reciprocating movements by the interior surface of the cylinder wall, and a flexible sealing element having a surface bonded to the piston and having a surface bonded to the cylinder wall, said sealing element being positioned in a groove in one of the cooperating parts large enough to permit free movement of the sealing element along the axis of the cylinder except for the restraining influence of the bond.

RUDOLPH A. GOEPFRICH.

CERTIFICATE OF CORRECTION.

Patent No. 2,298,007.　　　　　　　　　　　　　October 6, 1942.

RUDOLPH A. GOEPFRICH,

It is hereby certified that error appears in the printed specification of the above numbered patent requiring correction as follows: Page 2, first column, line 52, claim 3, for "grove and bonded" read --and--; lines 53, 54 and 55, same claim, strike out "the said sealing cylinder wall and to the outer cylindrical surface of the piston,"; and that the said Letters Patent should be read with this correction therein that the same may conform to the record of the case in the Patent Office.

Signed and sealed this 22nd day of December, A. D. 1942.

(Seal)

Henry Van Arsdale,
Acting Commissioner of Patents.